United States Patent
Aoyagi et al.

(10) Patent No.: US 10,442,724 B2
(45) Date of Patent: Oct. 15, 2019

(54) JOINING MATERIAL AND JOINED BODY USING SAME

(71) Applicant: HITACHI, LTD., Tokyo (JP)

(72) Inventors: Takuya Aoyagi, Tokyo (JP); Takashi Naito, Tokyo (JP); Tatsuya Miyake, Tokyo (JP)

(73) Assignee: HITACHI LTD., Tokyo (JP)

( * ) Notice: Subject to any disclaimer, the term of this patent is extended or adjusted under 35 U.S.C. 154(b) by 0 days.

(21) Appl. No.: 15/755,947

(22) PCT Filed: Jul. 11, 2016

(86) PCT No.: PCT/JP2016/070364
§ 371 (c)(1),
(2) Date: Feb. 27, 2018

(87) PCT Pub. No.: WO2017/051590
PCT Pub. Date: Mar. 30, 2017

(65) Prior Publication Data
US 2018/0244561 A1    Aug. 30, 2018

(30) Foreign Application Priority Data

Sep. 25, 2015  (JP) ................. 2015-187589

(51) Int. Cl.
*C03C 8/24* (2006.01)
*B32B 7/02* (2019.01)
(Continued)

(52) U.S. Cl.
CPC ............... *C03C 8/24* (2013.01); *B32B 7/02* (2013.01); *B32B 7/12* (2013.01); *C03C 3/122* (2013.01);
(Continued)

(58) Field of Classification Search
CPC .... C03C 8/24; C03C 8/08; C03C 8/02; C03C 3/14; C03C 3/122; C03C 8/04;
(Continued)

(56) References Cited

U.S. PATENT DOCUMENTS

| 3,798,114 A | 3/1974 | Chvatal |
| 6,545,947 B1 | 4/2003 | Morozumi et al. |
| 2014/0058201 A1* | 2/2014 | Mizuyoshi ......... G02B 23/2423 600/129 |

FOREIGN PATENT DOCUMENTS

| JP | 1976-138711 A | 11/1976 |
| JP | 1995-176645 A | 7/1995 |

(Continued)

OTHER PUBLICATIONS

International Search Report for WO/2017/051590, dated Aug. 16, 2016.

*Primary Examiner* — David Sample
*Assistant Examiner* — Donald M Flores, Jr.
(74) *Attorney, Agent, or Firm* — Volpe and Koenig, P.C.

(57) ABSTRACT

The purpose of the present invention is to provide a joining material that can easily join materials to be joined even when characteristics and physical properties thereof differ greatly. To solve the above problem, the joining material according to the present invention is characterized by including a base material, a first layer that is disposed on one surface of the base material, and a second layer that is disposed on the other surface of the base material and includes a phase having a different coefficient of thermal expansion to that of the phase configuring the first layer, at least one of the first and second layers including glass having a softening point of 600° C. or lower.

14 Claims, 4 Drawing Sheets

(51) Int. Cl.
  *B32B 7/12* (2006.01)
  *C03C 3/12* (2006.01)
  *C03C 3/14* (2006.01)
  *C03C 3/21* (2006.01)
  *C03C 8/02* (2006.01)
  *C03C 8/04* (2006.01)
  *C03C 8/08* (2006.01)
  *B23K 35/36* (2006.01)

(52) U.S. Cl.
  CPC .............. *C03C 3/14* (2013.01); *C03C 3/21* (2013.01); *C03C 8/02* (2013.01); *C03C 8/04* (2013.01); *C03C 8/08* (2013.01); *B23K 35/3601* (2013.01); *B23K 35/3613* (2013.01); *B32B 2250/03* (2013.01); *B32B 2264/0214* (2013.01); *B32B 2264/105* (2013.01); *B32B 2264/107* (2013.01); *B32B 2307/30* (2013.01); *B32B 2405/00* (2013.01)

(58) Field of Classification Search
  CPC .... C03C 3/21; B32B 7/02; B32B 7/12; B32B 2250/03; B32B 2264/105; B32B 2405/00; B32B 2307/30; B32B 2264/107; B32B 2264/0214; B23K 35/3613; B23K 35/3601
  See application file for complete search history.

(56) References Cited

FOREIGN PATENT DOCUMENTS

| | | |
|---|---|---|
| JP | 2002-112393 A | 4/2002 |
| JP | 2013-013712 A | 1/2013 |
| JP | 2013-249210 A | 12/2013 |
| JP | 2015-072957 A | 4/2015 |
| JP | 2016-037422 A | 3/2016 |

* cited by examiner

JOINING MATERIAL AND JOINED BODY USING SAME

TECHNICAL FIELD

The present invention relates to a joining material and a joined body using the joining material.

BACKGROUND ART

In an electric/electronic part, LED lighting, a semiconductor module, and various sensors, there is a joint between a semiconductor chip and a ceramic, a glass, a metal, or a resin. Usually, such a joint is joined with a solder material, a low melting point glass, or a resin.

However, in a case of joining in which materials to be joined have many different characteristics and physical properties, joining is difficult disadvantageously. For example, in a case where materials to be joined with largely different linear coefficients of thermal expansion are joined to each other, joining is difficult because a joining material cracks or peels due to presence of a residual stress at the time of joining.

PTL 1 discloses a joined body in which a frame body is formed on a joining surface along a periphery of a joining layer in order to separate a position where a thermal stress concentrates from a position where a joining portion of a ceramic substrate easily breaks.

PTL 2 discloses a composite sealing material in which sealing material layers are formed on both surfaces of a glass film in order to suppress, when glass substrates are sealed with each other, a decrease in sealing strength due to an undue stress remaining in the glass substrates or a sealed portion after laser sealing because of a difference in a coefficient of thermal expansion between the glass substrates and the sealing material. PTL 2 further discloses that the sealing material contains a bismuth-based glass powder and a refractory filler.

CITATION LIST

Patent Literature

PTL 1: JP 2015-72957 A
PTL 2: JP 2013-249210 A

SUMMARY OF INVENTION

Technical Problem

In a case where a thermal stress generated in a joining portion is relaxed by a structure as in PTL 1, a new step for forming a structure for stress relaxation is required, and a manufacturing process is complicated.

The composite sealing material disclosed in PTL 2 is used for sealing glass substrates with each other. Therefore, physical properties of sealing material layers on both surfaces of a glass film are not defined, and it is difficult to apply the composite sealing material to joining between materials to be joined with largely different characteristics and physical properties.

Therefore, an object of the present invention is to provide a joining material capable of easily performing joining even in a case where materials to be joined have largely different characteristics and physical properties.

Solution to Problem

In order to achieve the above object, a joining material according to the present invention includes a base material, a first layer disposed on one surface of the base material, and a second layer disposed on another surface of the base material and including a phase having a different coefficient of thermal expansion from that of a phase constituting the first layer, and is characterized in that at least one of the first layer and the second layer includes a glass having a softening point of 600° C. or lower.

Advantageous Effects of Invention

The present invention can provide a joining material capable of easily performing joining even in a case where materials to be joined have largely different characteristics and physical properties.

DESCRIPTION OF EMBODIMENTS

Figure 1:
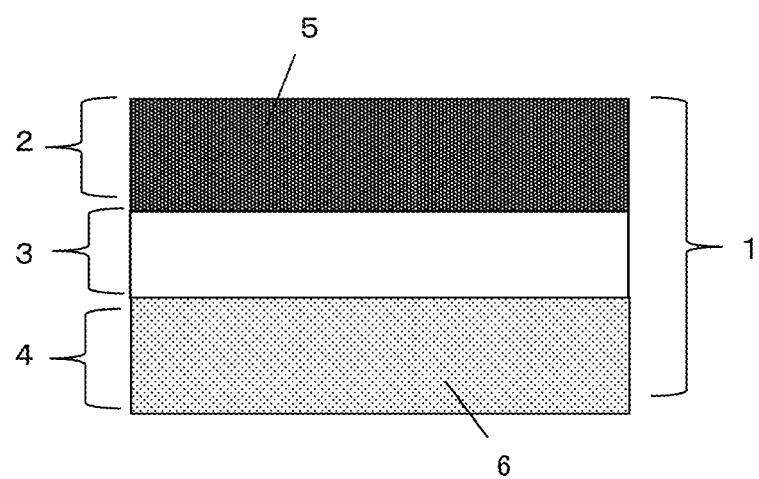
FIG. 1 is a cross-sectional view of a joining material according to an embodiment of the present invention.

Hereinafter, an embodiment of the present invention will be described. FIG. 1 illustrates a cross-sectional view of a joining material according to an embodiment of the present invention. A joining material 1 includes a base material 3, a first layer 2 formed on one surface of the base material 3, and a second layer 4 formed on another surface of the base material 3. At least one of the first layer and the second layer includes a glass having a softening point of 600° C. or lower. Each of the first layer and the second layer contains at least an adhesive component and, if necessary, a filler is added thereto. The second layer includes a phase different from a phase constituting the first layer. That is, the first layer 2 and the second layer 4 are different from each other in at least one of the kind of the adhesive component, the content of the adhesive component, the kind of the filler, and the addition amount of the filler. As described above, by using different joining materials for the first layer 2 and the second layer 4, it is possible to enhance reliability of adhesion between materials to be joined with largely different properties.

(First Layer and Second Layer)

Hereinafter, each of the first layer and the second layer is referred to as a joining layer. The joining layer can be appropriately selected according to characteristics of a material to be joined or required characteristics of a joined body. The joining layer contains, for example, a solder, a low melting point glass, or a resin as an adhesive component. Here, the low melting point glass is defined as a glass having a softening point of 600° C. or lower.

Examples of a combination of an adhesive component 5 contained in the first layer 2 and an adhesive component 6 contained in the second layer 4 include a solder and a solder, a low melting point glass and a low melting point glass, a resin and a resin, a solder and a low melting point glass, a solder and a resin, and a low melting point glass and a resin. The solder, the low melting point glass, and the resin are not particularly limited as long as being materials usually used for joining. The adhesive component is desirably made of a lead-free adhesive material in consideration of an environment. The term "lead-free" as used in the present invention permits inclusion of a prohibited substance in the Restriction of Hazardous Substances (RoHS) Directive (effective from Jul. 1, 2006) within a range of a specified value or less.

As the adhesive component 5 and the adhesive component 6, it is preferable to use a combination which can be joined to a material to be joined at the same temperature. By selecting a material which can be joined to a material to be joined at the same temperature as the adhesive component 5 and the adhesive component 6, it is possible to cause the first layer and the second layer to adhere to the material to be joined at the same temperature, and a joining step can be simplified.

An adhesion temperature of a joining material is not particularly limited, but is preferably 600° C. or lower, and more preferably 300° C. or lower. When the adhesion temperature is 300° C. or lower, the kind of an adhesive material to be joined increases. That is, when the joining temperature is 300° C. or lower, it is possible to use a resin as an adhesive component for the first layer and the second layer. As a result, the number of combinations of the selectable first layer and second layer increases, and therefore a joining material matching characteristics of a material to be joined can be provided.

Examples of the solder material include a Sn—Ag type, a Sn—Sb type, a Sn—Cu type, a Sn—Ag—Cu type, a Sn—Zn type, a Sn—Bi type, and a Sn—In—Ag—Bi type.

Examples of the low melting point glass include an oxide glass such as a SnO—$P_2O_5$ type, a $Bi_2O_3$—$B_2O_3$ type, a $V_2O_5$—$P_2O_5$ type, a $V_2O_5$—$TeO_2$ type, a $WO_3$—$P_2O_5$ type, an $Ag_2O$—$P_2O_5$ type, or a $V_2O_5$—$TeO_2$—$Ag_2O$ type. The softening point of the low melting point glass is preferably 400° C. or lower, and more preferably 300° C. or lower. By using a low melting point glass having a softening point of 400° C. or lower, it is possible to expand a range of an adhesive material to be joined. In order to realize a softening point of 400° C. or lower, the low melting point glass desirably contains a vanadium (V) element. Furthermore, by inclusion of silver (Ag) or tellurium (Te) as an element, a softening point of 300° C. or lower can be realized. Regarding preferable contents of V, Ag, and Te, the total content of $V_2O_5$, $TeO_2$, and $Ag_2O$ is 75% by mass or more when components are represented by oxides. Each of the contents of $TeO_2$ and $Ag_2O$ is 1 to 3 times the content of $V_2O_5$. Furthermore, at least one selected from BaO, $WO_3$, and $P_2O_5$ is preferably contained as a first additional component in an amount of 0% by mass or more and 20% by mass or less in the low melting point glass component, and at least one selected from $Y_2O_3$, $La_2O_3$, $Al_2O_3$, and $Fe_2O_3$ is preferably contained as a second additional component in an amount of 0.1% by mass or more and 1.0% by mass or less in the low melting point glass component.

Figure 2:
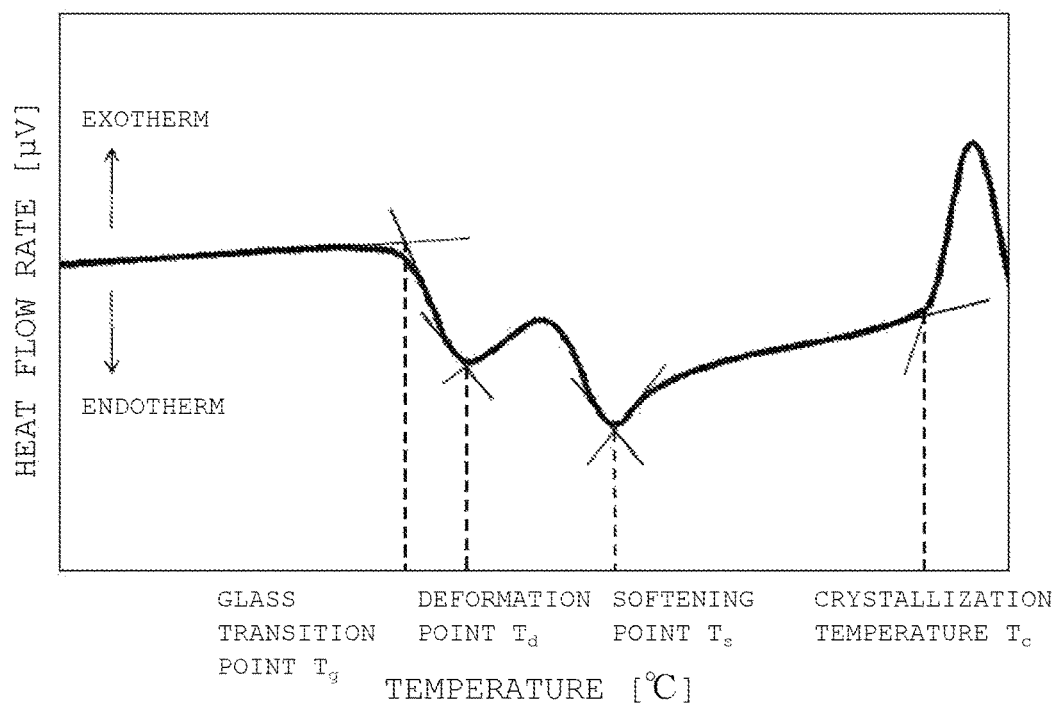
FIG. 2 is an example of a DTA curve obtained by DTA measurement of a glass composition.

By using a glass having a softening point of 300° C. or lower as the adhesive components of the first layer and the second layer, the joining temperature can be 300° C. or lower. Here, a characteristic temperature of a manufactured glass was determined by differential thermal analysis (DTA). FIG. 2 illustrates a typical DTA curve of a glass. As illustrated in FIG. 2, a second endothermic peak was taken as a softening point (Ts).

As the resin, either a crystalline material or an amorphous material may be used, and not only one kind but also several kinds may be used in combination. Examples of the resin include polyethylene, polyvinyl chloride, polypropylene, polystyrene, polyvinyl acetate, an ABS resin, an AS resin, an acrylic resin, a polyacetal resin, polyimide, polycarbonate, modified polyphenylene ether (PPE), polybutylene terephthalate (PBT), polyarylate, polysulfone, polyphenylene sulfide, polyether ether ketone, a polyimide resin, a fluororesin, polyamide imide, polyether ether ketone, an epoxy resin, a phenol resin, polyester, and polyvinyl ester. However, in a case where the resin is used together with a solder material or a low melting point glass, a heat resistant temperature and a glass transition point (Tg) of the resin or the like are preferably high. The glass transition point is preferably 200° C. or higher.

Figure 3:
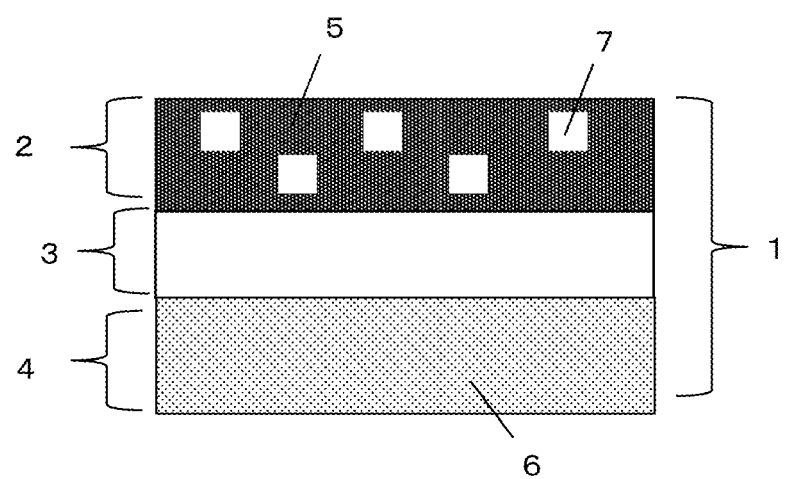
FIG. 3 is a cross-sectional view of a joining material according to an embodiment of the present invention.
Figure 4:
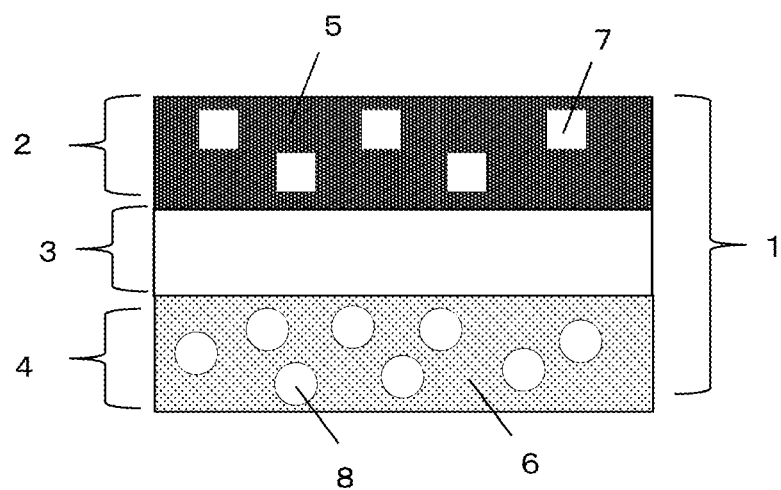
FIG. 4 is a cross-sectional view of a joining material according to an embodiment of the present invention.

The adhesive components 5 and 6 in the joining layers of the present invention can be selected from a resin, a low melting point glass, and a solder material as described above. However, it is not necessary that the joining layers only contain the adhesive components, but a filler can be appropriately added thereto according to an adhesion property to a material to be joined and characteristics required for a joined body. FIG. 3 illustrates a cross-sectional view of a joining material in which a filler 7 has been added to the first layer 2. FIG. 4 illustrates a cross-sectional view of a joining material in which the filler 7 has been added to the first layer 2 and a filler 8 has been added to the second layer 4. As illustrated in FIG. 3, the filler 7 may be added to either the first layer or the second layer. As illustrated in FIG. 4, fillers may be added to both the first layer and the second layer.

Examples of the filler include a ceramic, a metal material, and a resin. For example, in a case where the first layer or the second layer contains a low melting point glass as an adhesive component, thermal expansion can be adjusted by using a low thermal expansion ceramic.

Examples of the low thermal expansion ceramic include zircon, zirconia, quartz glass, β-spongemen, cordierite, mullite, β-eucryptite, β-quartz, zirconium phosphate, zirconium phosphate tungstate (ZWP), zirconium tungstate, and a solid solution thereof. These materials can be used singly or in combination of two or more kinds thereof.

In addition, in a case where a metal material is used as the filler, conductivity and thermal conductivity can be improved. Examples of the metal material include gold, silver, copper, aluminum, tin, zinc, iron, nickel, and an alloy thereof, and these materials can be used singly or in combination of two or more kinds thereof.

In a case of using a resin as the filler, examples of the resin include an epoxy resin, a phenol resin, a urea resin, a melamine resin, a silicone resin, an unsaturated polyester resin, a polyurethane resin, nylon, polyacetal, polysulfone, polyetherimide, polyamideimide, liquid crystal polymer, polytetrafluoroethylene, polychlorotrifluoroethylene, polyvinylidene fluoride, aromatic polyether, polyphenylene ether, polyether ether ketone, polyphenylene oxide, polycarbonate, polyethylene terephthalate, polybutylene terephthalate, polyethylene naphthalate, polyethersulfone, polyarylate, and polyoxybenzoyl polyester. Preferably, the resin component contains at least one selected from an aromatic polyether, polyether ether ketone, polycarbonate, polyethylene terephthalate, polybutylene terephthalate, polyethylene naphthalate, polyethersulfone, polyarylate, and polyoxybenzoyl polyester. These resin components have high heat resistance and excellent moldability, and therefore are suitable as the resin component of the filler.

The content of the filler is preferably 1 to 60% by volume, and more preferably 30% by volume or less with respect to a low thermal expansion ceramic from a viewpoint of fluidity of a glass and reactivity. The content is preferably 1 to 99% by volume, and more preferably 30 to 80% by volume with respect to a metal material. The content is preferably 1 to 99% by volume, and more preferably 5 to 20% by volume with respect to a resin.

(Base Material)

The base material is not limited as long as having a higher heat resistant temperature than a formation temperature of the first layer and the second layer. For example, a resin film, a glass film, a metal film, or the like can be used according to required characteristics of a joined body.

A heat resistant temperature of the base material is preferably 350° C. or higher, and more preferably 650° C. or higher. The thickness of the base material is desirably 300 m or less, and more preferably 50 μm or less from a viewpoint of processability applied at the time of joining.

When materials to be joined with largely different coefficients of thermal expansion are joined to each other, a coefficient of thermal expansion of a joining material preferably changes stepwise. That is, when a coefficient of thermal expansion of the first layer as a joining layer is represented by $\alpha_1$, a coefficient of thermal expansion of the second layer is represented by $\alpha_2$, and a coefficient of thermal expansion of the base material is represented by $\alpha_{film}$, a relationship of $\alpha_1 < \alpha_{film} < \alpha_2$ is preferably satisfied. The coefficient of thermal expansion can be adjusted by adjusting a glass composition, the kind of a filler, and the content of the filler. By changing the coefficient of thermal expansion stepwise, it is possible to improve joining reliability between materials to be joined. Particularly, in a case where a brittle material containing a low melting point glass is used as an adhesive component of a joining layer, a brittle material having a coefficient of thermal expansion between the coefficient of thermal expansion of the first layer and the coefficient of thermal expansion of the second layer is preferably used as a base material.

By adding a large amount of ductile metal or resin to a joining layer, it is also possible to relax a stress in a difference in coefficient of thermal expansion and to perform joining. In this case, either a brittle material or a ductile material may be used as the base material. Here, the "ductile metal" refers to gold, silver, copper, aluminum, tin, zinc, iron, nickel, an alloy thereof, or the like.

(Method for Manufacturing Joining Material)

A joining material is manufactured by forming a joining layer (a first layer and a second layer) on a base material. The joining material can be manufactured, for example, by the following method. A joining layer forming paste is manufactured. The joining layer forming paste can be manufactured by kneading a powder such as a solder or a low melting point glass as an adhesive component, a solvent, and a binder with a powder such as a solder or a low melting point glass as an adhesive component, a solvent, and a binder. In a case where a filler is mixed in a joining layer, a filler powder is also added at the time of manufacturing the joining layer forming paste.

The manufactured joining layer forming paste is applied onto a base material, and then the binder is removed from the resulting product and the resulting product is fired to form a joining material.

A method for manufacturing a solder material used for the joining layer forming paste is not particularly limited. However, a material as a parent material is melted in a heating furnace or the like, and then is subjected to an atomizing treatment with water, gas, or the like to obtain a good powder.

A method for manufacturing a glass used for the joining layer forming paste is not particularly limited. However, the glass can be manufactured by putting a raw material obtained by blending and mixing oxides as a raw material in a platinum crucible, heating the raw material using an electric furnace at a temperature rising rate of 5 to 10° C./min up to 800 to 1100° C., and holding the material inside the crucible for several hours. During holding, the material inside the crucible is desirably stirred in order to obtain a homogeneous glass. When the crucible is taken out of the electric furnace, the contents of the crucible are desirably poured onto a graphite mold or a stainless steel plate previously heated to about 100 to 150° C. in order to prevent moisture adsorption to a glass surface.

A solvent used for the joining layer forming paste is not particularly limited, but examples thereof include butyl carbitol acetate and α-terpineol.

A binder used for the joining layer forming paste is not particularly limited, but examples thereof include ethyl cellulose and nitrocellulose.

(Material to be Joined and Applied Use)

A material to be joined, used for joining with the joining material of the present invention is not particularly limited because a joining material is selected according to a material to be joined, and various materials can be used. For example, the joining material of the present invention is applicable to joining metal materials, ceramic materials, resin materials, a metal material and a ceramic, a metal material and a resin material, or a ceramic material and a resin material. As a specific combination of materials to be joined, a combination of Si or SiC with SUS, Cu, Al, Al—SiC, $Al_2O_3$, or the like is preferable. This is because the materials in each of these combinations have a large difference in a coefficient of thermal expansion to make it difficult to join the materials usually, and therefore the characteristics of the joining material of the present invention are utilized. A combination of a carbon fiber reinforced plastic (CFRP) with Ti or Al is also preferable. This is because in a joining layer of the joining material in the present invention, a combination of a resin with a low melting point glass or a solder material is possible, and therefore the characteristics of the present invention are utilized. In addition, the joining material of the present invention can be used as a sealing material.

Hereinafter, the present invention will be described in more detail using Examples. However, the present invention is not limited to Examples described here, and Examples may be combined appropriately.

Example 1

[Joining Material Having Different Glass Joining Layers Formed Therein]

<Manufacture of Glass>

G1 to G11 in Table 1 indicate glass compositions manufactured and examined. All the components are expressed in % by mass (mass percent) in terms of oxide. These low melting point glass compositions were substantially free of lead in consideration of an environment and safety. As raw materials of the components, vanadium pentoxide, tellurium oxide, ferric oxide, phosphorus pentoxide, silver oxide, tungsten oxide, barium carbonate, barium phosphate, antimony oxide, potassium carbonate, bismuth oxide, boron oxide, zinc oxide, copper oxide, and lanthanum oxide were used.

Glass was manufactured by the following procedures. In a platinum crucible, 1 kg of a mixed powder obtained by blending and mixing raw material compounds so as to have a composition indicated in Table 1 was put, was heated using an electric furnace at a temperature rising rate of 5 to 10° C./min up to a heating temperature of 800° C. to 1100° C., and was held for 2 hours. During holding, the material inside the crucible was stirred in order to obtain a homogeneous glass. Subsequently, the platinum crucible was taken out of the electric furnace, and the contents of the crucible were poured onto a stainless steel plate previously heated to 100° C. to obtain cast glass.

<Evaluation of Glass>

The glass poured onto the stainless steel plate was pulverized until the glass had an average particle diameter (D50) of less than 20 μm, and was subjected to differential thermal analysis (DTA) at a temperature rising rate of 5° C./min. A softening point (Ts) was thereby measured. Note that an alumina powder was used as a standard sample.

base material, and was dried. In order to blow off a resin, heating was performed at 330° C. for 30 minutes, and a glass was temporarily fired in a range of a softening point of the glass to the softening point+50° C. to obtain a joining material. At this time, the thickness of each of the joining materials was about 60 μm.

In addition, thermal expansion characteristics of a single joining layer constituting each of upper and lower surfaces of a joining material were evaluated. For evaluation, a product obtained by subjecting only a mixed powder not

TABLE 1

| Glass No. | Glass composition (% by mass) | | | | | | | | | | | | | | Glass softening point [° C.] |
|---|---|---|---|---|---|---|---|---|---|---|---|---|---|---|---|
| | $V_2O_5$ | $TeO_2$ | $Fe_2O_3$ | $P_2O_5$ | $Ag_2O$ | $WO_3$ | $BaO$ | $Sb_2O_3$ | $K_2O$ | $Bi_2O_3$ | $B_2O_3$ | $ZnO$ | $CuO$ | $La_2O_3$ | |
| G1 | 25 | — | — | 25 | — | 40 | — | — | — | — | — | 10 | — | — | 548 |
| G2 | 50 | — | — | 25 | — | — | 5 | 20 | — | — | — | — | — | — | 445 |
| G3 | 50 | — | — | 24.1 | — | — | 25.9 | — | — | — | — | — | — | — | 440 |
| G4 | 45 | 30 | 15 | 10 | — | — | — | — | — | — | — | — | — | — | 377 |
| G5 | 47 | 30 | 10 | 13 | — | — | — | — | — | — | — | — | — | — | 364 |
| G6 | 40 | 30 | — | 4.8 | — | 10 | 15.2 | — | — | — | — | — | — | — | 357 |
| G7 | 38 | 30 | — | 5.8 | — | 10 | 11.2 | — | 5 | — | — | — | — | — | 336 |
| G8 | 20 | 30 | — | 5.2 | 30 | 10 | 4.8 | — | — | — | — | — | — | — | 295 |
| G9 | 19 | 31.3 | — | — | 42.4 | 2.4 | 4 | — | — | — | — | — | — | 0.9 | 231 |
| G10 | — | — | 0.4 | — | — | — | 3.4 | — | — | 76.8 | 8.1 | 6.3 | 5 | — | 450 |

<Manufacture of Joining Material>

In manufacturing a joining material, first, a joining layer forming paste was manufactured in order to form joining layers on upper and lower surfaces of a base material. At this time, a glass film (thickness: 30 μm, thermal expansion coefficient: 66×10⁻⁷/° C.) was used as the base material. The glass manufactured in Table 1 was pulverized using a jet mill until the glass had an average particle diameter (D50) of about 3 μm. Thereafter, Al, Ag, $Zr_2(WO_4)(PO_4)_2$(ZWP), or cordierite in a predetermined amount was added thereto as a filler of about 3 μm similarly. To this mixture, ethyl cellulose as a binder resin and butyl carbitol acetate as a solvent were added and kneaded to manufacture a joining layer forming paste. In addition, in a case where a resin component was added as a filler, modified polyphenylene ether (OPE2St) manufactured by Mitsubishi Gas Chemical Co., Ltd. was added as a resin component, and α-terpineol was added thereto as a solvent. The resulting mixture was kneaded to manufacture a joining layer forming paste. The composition of the manufactured joining layer forming paste is indicated in Table 2.

Thereafter, the joining layer forming paste indicated in Table 2 was applied onto the base material by screen printing, and was dried at 150° C. for 30 minutes. Thereafter, the paste was similarly applied onto the opposite side of the containing a binder resin or a solvent to uniaxial pressure molding and then densely firing the molded product using an electric furnace was used. Thereafter, a test piece of 4 mm×4 mm×15 mm was cut out and a coefficient of thermal expansion in a range of 50° C. to 250° C. was measured using a push rod type thermomechanical analyzer. Results thereof are also indicated in Table 2.

<Trial Manufacture of Joined Body>

As a material to be joined, a Si substrate which had been subjected to an Al metallization treatment (coefficient of thermal expansion: 37×10⁻⁷/° C.) and a SUS630 substrate which had been subjected to Ni plating (coefficient of thermal expansion: 110×10⁻⁷/° C.) were selected. From the bodies to be joined, a joined body was manufactured by trial using a joining material indicated in Table 2. A sample in which a joined body could be formed was evaluated as ○, and a sample in which a joined body could not be formed due to peeling or the like was evaluated as x. Furthermore, reliability of joining was evaluated by performing a temperature cycle test at −40° C. to 150° C. At this time, five samples were evaluated. A case where no peeling was observed after 100 cycles was evaluated as ○, and a case where peeling was observed in some samples was evaluated as Δ.

TABLE 2

| Joining material No. | | Composition of joining layer forming paste (content is expressed by % by volume) | | | | | | Coefficient of thermal expansion [×10⁻⁷/° C.] | Adhesion temperature [° C.] | Whether or not adhesion is possible | Reliability | |
|---|---|---|---|---|---|---|---|---|---|---|---|---|
| | | Glass | Content | Filler material 1 | Content | Filler material 2 | Content | | | | | |
| A1 | Upper surface | G1 | 90 | ZWP | 10 | — | — | 49 | 600 | ○ | ○ | Example |
| | Lower surface | G1 | 70 | Al | 30 | — | — | 97 | | | | |
| A2 | Upper surface | G1 | 100 | — | — | — | — | 58 | 600 | ○ | Δ | Example |
| | Lower surface | G1 | 70 | Al | 30 | — | — | 97 | | | | |
| A3 | Upper surface | G2 | 70 | ZWP | 30 | — | — | 48 | 490 | ○ | ○ | Example |
| | Lower surface | G3 | 90 | ZWP | 10 | — | — | 90 | | | | |

TABLE 2-continued

| Joining material No. | | Glass | Content | Filler material 1 | Content | Filler material 2 | Content | Coefficient of thermal expansion [×10⁻⁷/° C.] | Adhesion temperature [° C.] | Whether or not adhesion is possible | Reliability | |
|---|---|---|---|---|---|---|---|---|---|---|---|---|
| A4 | Upper surface | G2 | 70 | ZWP | 30 | — | — | 48 | 490 | ○ | ○ | Example |
| | Lower surface | G10 | 75 | Cordierite | 25 | — | — | 105 | | | | |
| A5 | Upper surface | G4 | 70 | ZWP | 30 | — | — | 56 | 400 | ○ | Δ | Example |
| | Lower surface | G5 | 90 | ZWP | 10 | — | — | 89 | | | | |
| A6 | Upper surface | G4 | 75 | ZWP | 25 | — | — | 62 | 400 | ○ | Δ | Example |
| | Lower surface | G5 | 90 | ZWP | 10 | — | — | 89 | | | | |
| A7 | Upper surface | G6 | 30 | Al | 70 | — | — | 199 | 400 | ○ | ○ | Example |
| | Lower surface | G6 | 80 | ZWP | 20 | — | — | 94 | | | | |
| A8 | Upper surface | G7 | 20 | Ag | 80 | — | — | 184 | 370 | ○ | ○ | Example |
| | Lower surface | G7 | 80 | ZWP | 20 | — | — | 105 | | | | |
| A9 | Upper surface | G8 | 20 | Ag | 80 | — | — | 197 | 320 | ○ | ○ | Example |
| | Lower surface | G8 | 20 | Al | 80 | — | — | 230 | | | | |
| A10 | Upper surface | G8 | 20 | Ag | 75 | OPE2St | 5 | 198 | 320 | ○ | ○ | Example |
| | Lower surface | G8 | 20 | Al | 75 | OPE2St | 5 | 232 | | | | |
| A11 | Upper surface | G9 | 20 | Ag | 80 | — | — | 204 | 260 | ○ | ○ | Example |
| | Lower surface | G9 | 20 | Al | 80 | — | — | 238 | | | | |
| A12 | Upper surface | G9 | 20 | Ag | 60 | OPE2St | 20 | 240 | 260 | ○ | ○ | Example |
| | Lower surface | G9 | 20 | Ag | 70 | OPE2St | 10 | 238 | | | | |
| A13 | Upper surface | G9 | 20 | Ag | 80 | — | — | 204 | 260 | ○ | ○ | Example |
| | Lower surface | G9 | 20 | Al | 70 | OPE2St | 10 | 238 | | | | |
| A14 | Upper surface | G1 | 100 | — | — | — | — | 58 | 600 | X | — | Comparative Example |
| | Lower surface | G1 | 100 | — | — | — | — | 58 | | | | |
| A15 | Upper surface | G3 | 90 | ZWP | 10 | — | — | 90 | 490 | X | — | Comparative Example |
| | Lower surface | G3 | 90 | ZWP | 10 | — | — | 90 | | | | |
| A16 | Upper surface | G10 | 75 | Cordierite | 25 | — | — | 105 | 490 | X | — | Comparative Example |
| | Lower surface | G10 | 75 | Cordierite | 25 | — | — | 105 | | | | |

Table 2 indicates that, by using a joining material in which different joining layers are formed on upper and lower surfaces of a base material, as in the present Example, a joined body can be formed even in joining of materials to be joined with largely different coefficients of thermal expansion, such as Si and SUS630. Furthermore, interface portions of samples which could be joined were evaluated using an ultrasonic flaw detection device. As a result, samples which had been joined using joining materials A10 and A12 had no void and could form particularly good joined bodies. From this, it has been found that it is particularly preferable to contain a resin as a filler.

Example 2

A joining material indicated in Table 3 was manufactured in a similar manner to the method described in Example 1 except that an Al foil (thickness: 30 μm) was used as a base material of a joining material in place of a glass film. Similarly, a Si substrate and SUS630 were selected as materials to be joined, and a joined body was manufactured by trial. Evaluation results of joined bodies are also indicated in Table 3.

TABLE 3

| Joining material No. | | Glass | Content | Filler material 1 | Content | Filler material 2 | Content | Coefficient of thermal expansion [×10⁻⁷/° C.] | Adhesion temperature [° C.] | Whether or not adhesion is possible | Reliability | |
|---|---|---|---|---|---|---|---|---|---|---|---|---|
| B1 | Upper surface | G2 | 70 | ZWP | 30 | — | — | 48 | 490 | ○ | ○ | Example |
| | Lower surface | G3 | 90 | ZWP | 10 | — | — | 90 | | | | |
| B2 | Upper surface | G6 | 30 | Al | 70 | — | — | 199 | 400 | ○ | ○ | Example |
| | Lower surface | G6 | 80 | ZWP | 20 | — | — | 94 | | | | |
| B3 | Upper surface | G8 | 20 | Ag | 75 | OPE2St | 5 | 198 | 320 | ○ | ○ | Example |
| | Lower surface | G8 | 20 | Al | 75 | OPE2St | 5 | 232 | | | | |
| B4 | Upper surface | G9 | 20 | Ag | 80 | — | — | 204 | 260 | ○ | ○ | Example |
| | Lower surface | G9 | 20 | Al | 80 | — | — | 238 | | | | |
| B5 | Upper surface | G9 | 20 | Ag | 60 | OPE2St | 20 | 240 | 260 | ○ | ○ | Example |
| | Lower surface | G9 | 20 | Ag | 70 | OPE2St | 10 | 238 | | | | |
| B6 | Upper surface | G3 | 90 | ZWP | 10 | — | — | 90 | 490 | X | — | Comparative Example |
| | Lower surface | G3 | 90 | ZWP | 10 | — | — | 90 | | | | |

Table 3 indicates that a good joined body can be formed as in Example 1 even in a case where an Al foil is used as a base material. Furthermore, thermal conductivity of a sample which could be joined was evaluated. As a result, B3, B4, and B5 had particularly good thermal conductivities as compared with B1, B2, and the samples of Example 1. Therefore, it can be said that it is possible to provide a joining material having excellent heat dissipation by using a metal film such as an Al foil for a base material and further introducing a large amount of metal filler into a joining layer.

Example 3

As materials to be joined, a SiC substrate which had been subjected to an Al metallization treatment (coefficient of thermal expansion: $37 \times 10^{-7}/°$ C.) and a copper substrate which had been subjected to Ni plating (coefficient of thermal expansion: $165 \times 10^{-7}/°$ C.) were selected. Joining was performed in a similar manner to Example 2 using B4 and B5 joining materials in Table 3 described in Example 2 as joining materials. Results thereof indicate that good joined bodies could be formed for both cases, and reliability was also evaluated as ○.

Example 4

As a material to be joined, a Ti substrate and a polyimide highly heat resistant CFRP substrate were selected. An Al foil (thickness: 30 μm) was used as a base material of a joining material as in Example 2, a polyimide resin (glass transition temperature: 210° C.) was used for an upper surface of the base material, and the same material as the lower surface of A13 in Example 1 was used for a lower surface of the base material to form a joining material. Joining was performed by making preparation such that the upper surface of the formed joining material was in contact with a CFRP substrate and the lower surface was in contact with a Ti base material and performing pressure molding at a temperature of 260° C. for 30 minutes. Results thereof indicate that a good joined body could be formed, and reliability was also evaluated as ○.

REFERENCE SIGNS LIST

1 Joining material
2 First layer
3 Base material
4 Second layer
5, 6 Adhesive component
6, 8 Filler

The invention claimed is:

1. A joining material comprising:
    a base material;
    a first layer disposed on one surface of the base material; and
    a second layer disposed on another surface of the base material and including a phase having a different coefficient of thermal expansion from that of a phase constituting the first layer, wherein:
    the first layer and the second layer includes a glass having a softening point of 600° C. or lower,
    the softening point of the glass contained in the first layer is different from that of the glass contained in the second layer, and
    the glass contained in the first layer contains vanadium and the glass contained in the second layer contains vanadium.

2. The joining material according to claim 1, wherein at least one of the first layer and the second layer further includes a filler.

3. The joining material according to claim 2, wherein the filler is at least one of a ceramic, a metal material, and a resin.

4. The joining material according to claim 2, wherein each of the first layer and the second layer contains the glass and the filler.

5. The joining material according to claim 4, wherein a kind of the filler is different between the first layer and the second layer.

6. The joining material according to claim 4, wherein content of the filler is different between the first layer and the second layer.

7. The joining material according to claim 1, wherein the glass contained in the first layer has a softening point of 400° C. or lower and the glass contained in the second layer has a softening point of 400° C. or lower.

8. The joining material according to claim 1, wherein the glass contained in the first layer further contains at least one of silver and tellurium and the glass contained in the second layer further contains at least one of silver and tellurium.

9. The joining material according to claim 1, wherein when a coefficient of thermal expansion of the first layer is represented by $\alpha 1$, a coefficient of thermal expansion of the second layer is represented by $\alpha 2$, and a coefficient of thermal expansion of the base material is represented by $\alpha$film, a relationship of $\alpha 1 < \alpha\text{film} < \alpha 2$ is satisfied.

10. The joining material according to claim 1, wherein the second layer contains a resin.

11. The joining material according to claim 1, wherein the base material has a thickness of 300 μm or less.

12. The joining material according to claim 11, wherein the base material has a thickness of 50 μm or less.

13. A joined body comprising the joining material according to claim 1.

14. A joining material comprising:
    a base material;
    a first layer disposed on one surface of the base material; and
    a second layer disposed on another surface of the base material and including a phase having a different coefficient of thermal expansion from that of a phase constituting the first layer, wherein:
    the first layer and the second layer includes a glass having a softening point of 600° C. or lower,
    the softening point of the glass contained in the first layer is different from that of the glass contained in the second layer, and
    at least one of the glass contained in the first layer and the glass contained in the second layer has a softening point of 400° C. or lower.

* * * * *